United States Patent

Byers et al.

[11] Patent Number: 5,292,100
[45] Date of Patent: Mar. 8, 1994

[54] ADJUSTABLE SUPPORT FOR VEHICLE SIDE VIEW MIRROR

[76] Inventors: Gary L. Byers; Timothy W. Byers, both of P.O. Box 550, Whitefish, Mont. 59937

[21] Appl. No.: 47,946

[22] Filed: Apr. 16, 1993

[51] Int. Cl.[5] .................................. A47G 1/24
[52] U.S. Cl. ........................ 248/480; 248/900; 359/874; 359/876
[58] Field of Search ............ 248/900, 549, 279, 282, 248/285, 480, 486, 479; 359/874, 876

[56] References Cited

U.S. PATENT DOCUMENTS

| | | | |
|---|---|---|---|
| 2,969,715 | 1/1961 | Mosby | 248/486 X |
| 4,606,619 | 8/1986 | Yamana | 248/486 X |
| 4,623,115 | 11/1986 | Brester | 248/900 X |
| 4,711,538 | 12/1987 | Ohs | 359/874 |
| 4,715,701 | 12/1987 | Urban | 248/480 X |
| 4,730,913 | 3/1988 | Boothe | 359/874 |
| 4,753,410 | 6/1988 | Dyer | 248/480 |
| 4,793,582 | 12/1988 | Bronstein | 248/479 |
| 4,890,909 | 1/1990 | Schmidt | 248/486 X |
| 5,025,543 | 6/1991 | Byers | 359/874 X |
| 5,081,546 | 1/1992 | Bottrill | 248/486 |

*Primary Examiner*—J. Franklin Foss
*Attorney, Agent, or Firm*—Harry M. Cross, Jr.

[57] ABSTRACT

According to this invention a side mounted rear view mirror assembly, for vehicles having a mirror and mirror neck support member and further having generally horizontally disposed support bar means, comprises: a) a mirror support block means slidably mounted on the support bar means and having a first section through which the support bar means extends, and having a second section positioned rearwardly of the first section and depending downwardly, the second section having a neck support cavity therein within which the mirror neck support member may be inserted; and b) adjustment lock means in the block first section for releasably securing the block means to the support bar means at a desired position thereon; and lock means in the block second section adapted to hold and secure the neck support member in the neck support cavity.

8 Claims, 3 Drawing Sheets

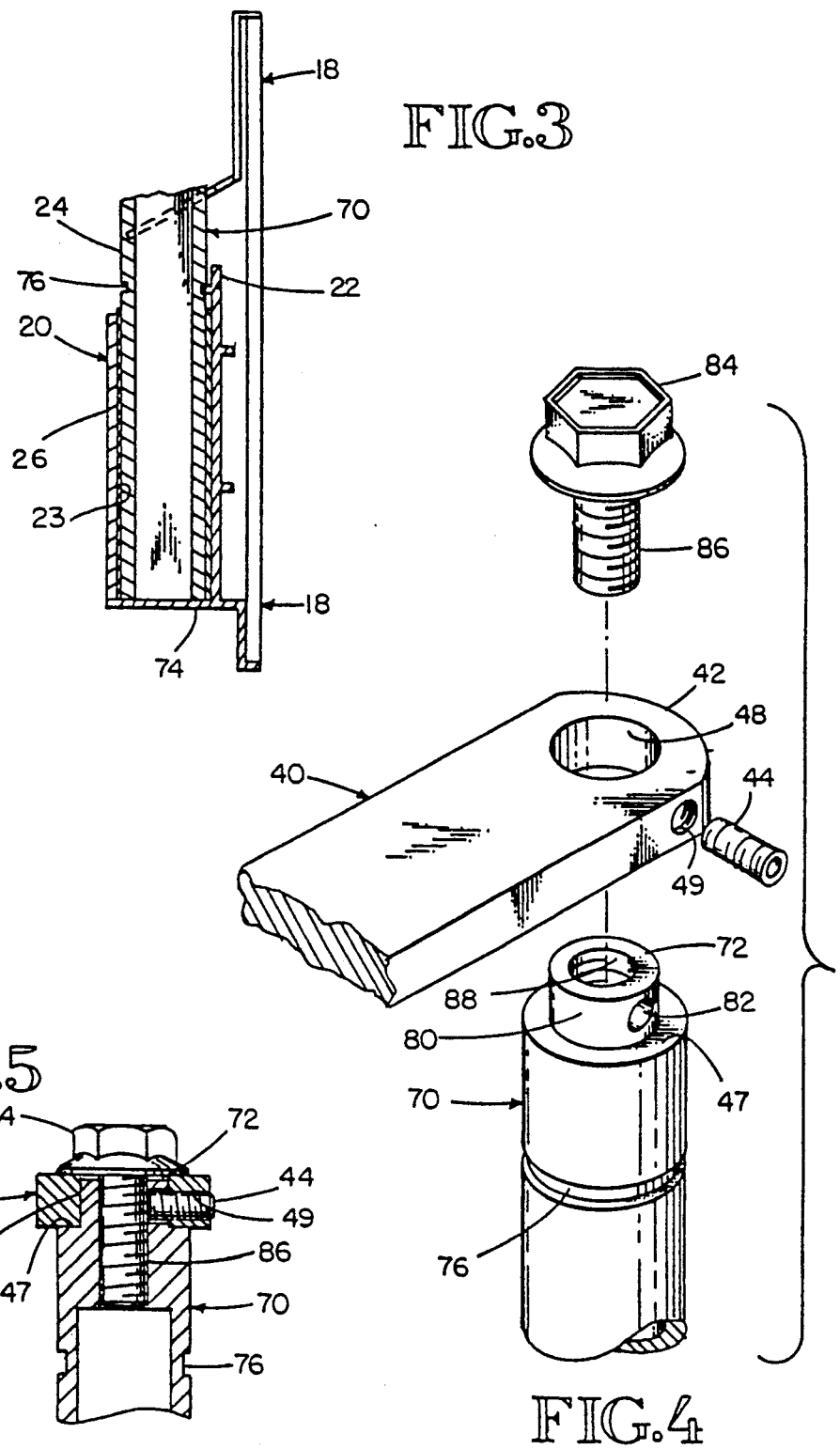

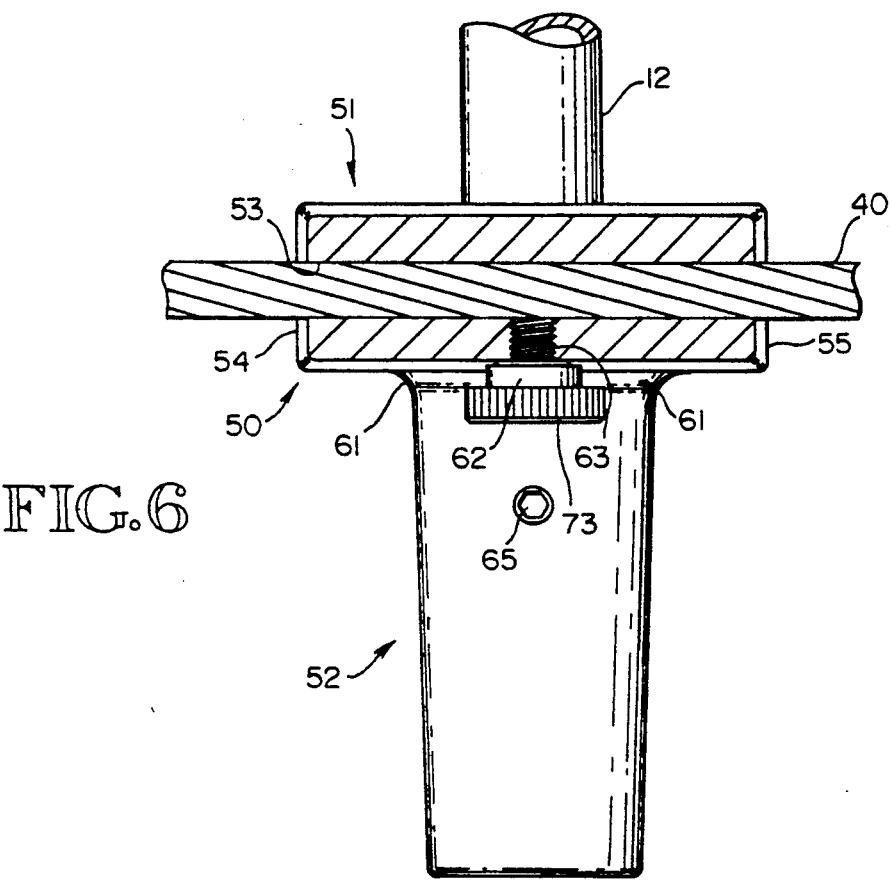

ADJUSTABLE SUPPORT FOR VEHICLE SIDE VIEW MIRROR

FIELD OF THE INVENTION

This invention relates generally to the field of side mounted, outside mirrors for cars and trucks, and more particularly to a side mounted mirror support which is moveable horizontally between extended and retracted positions.

BACKGROUND OF THE INVENTION

As operators are aware, vehicles used for carrying loads and towing, whether they be automobiles, pick-up trucks, vans or the like, frequently have a conventional side view mirror which does not enable the driver to see to the rear. These original equipment mirrors, so-called because they are standard equipment supplied by the manufacturer of the vehicle, are not laterally adjustable between extended and retracted positions. This driver inability to see to the rear is particularly acute where, for instance, an extra wide tow or load is involved such as a boat trailer, trailer home, camping trailer or high and wide load of whatever nature. Campers on the bed of pick-up trucks are another example. These loads are most often not only wide but long and the standard side mounted mirror simple does not permit an adequate line of vision to the rear of the load or tow. In addition, such mirrors often vibrate in their mounting, causing blurred vision.

After-market side mounted mirror assemblies have been proposed in an attempt to solve the aforementioned problems. Such mirror assemblies provide for lateral adjustability between extended and retracted positions. However, these proposed devices suffer from one or more difficulties. One such difficulty of one proposed solution is that the original equipment mirror stem must be severed to enable a replacement attachment to be substituted for the mirror stem. Some proposed solutions require the use of a mirror mounting that attaches to the vehicle at two or three points, rather than at just one point. Other proposed solutions require a the use of a complicated mounting structure to achieve the desired lateral adjustability. Still other proposed solutions do not permit the mirror location to be adjusted by the driver from the driver's seat while the vehicle is in motion.

SUMMARY OF THE INVENTION

The mirror assembly of this invention comprises a structure that utilizes the existing, original equipment door panel mirror mounting frame or support. The mirror assembly of this invention is especially suitable as an after-market assembly in that it is designed to use the existing mirror head and the associated mirror stem, in addition to the original equipment door panel mounting structure. The mirror assembly of this invention is intended for use with side view mirror arrangements wherein the original equipment mirror head is mounted on a stem having a vertical leg secured to the door panel mounting structure. The mirror head may be of the type that is pivotable about a horizontal axis for vertical vision adjustment and the stem itself may be rotatable about a vertical axis within the door panel mounting for swinging the mirror assembly toward and away from the vehicle.

According to this invention a side mounted rear view mirror assembly, for vehicles having a mirror and mirror neck support member and further having generally horizontally disposed support bar means, comprises: a) a mirror support block means slidably mounted on the support bar means and having a first section through which the support bar means extends, and having a second section positioned rearwardly of the first section and depending downwardly, the second section having a neck support cavity therein within which the mirror neck support member may be inserted; and b) adjustment lock means in the block first section for releasably securing the block means to the support bar means at a desired position thereon; and lock means in the block second section adapted to hold and secure the neck support member in the neck support cavity.

Accordingly, it is among the many features of the invention to provide a horizontally adjustable and repositionable exterior side view mirror support structure which is uniquely simple, inexpensive, rugged and durable. The mirror support device allows the vehicle owner to utilize the existing mounting means such that the mirror itself is disconnected from the original support and replaced on the support structure of this invention. No special tools are required to install the device and it is not necessary to drill any holes. The invention is designed to be tamper proof and retains the advantage of using the original mirror support structure mounted on the door panel.

BRIEF DESCRIPTION OF THE DRAWINGS

FIG. 3 is a partial elevation view in cross section showing a replacement stem component in position within the FIGS. 1-2 door panel mounting structure;

FIG. 4 is an exploded view in perspective of the manner in which a mirror extension bar component is secured to the replacement stem; and FIG. 5 is a partial elevation view in cross section showing additional details for mounting the extension bar to the replacement stem.

FIG. 6 is a partial elevation view in cross section showing additional details for mounting the rectangular extension on the extension bar.

DESCRIPTION OF THE INVENTION

Figure 1:
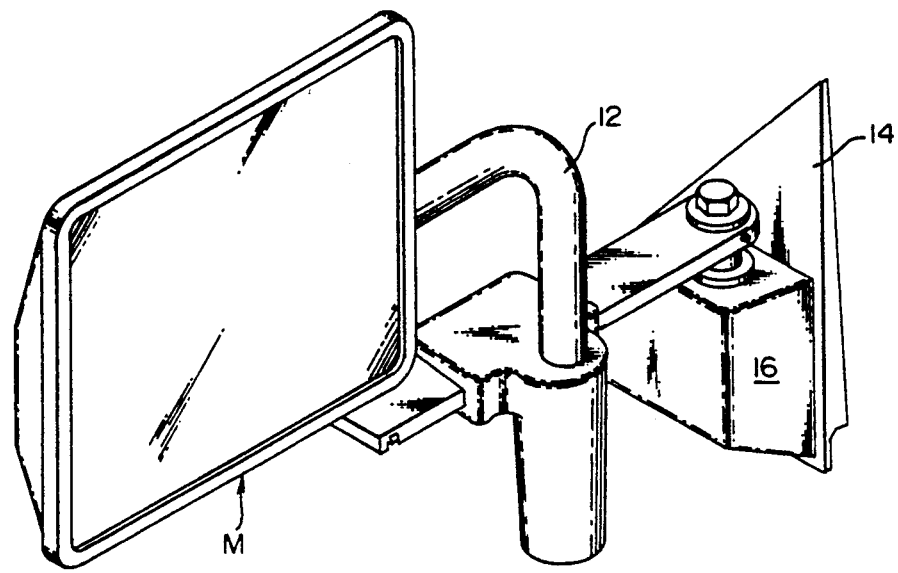
FIG. 1 is a view in perspective showing the mirror assembly of this invention mounted to a vehicle exterior door panel mounting.
Figure 2:
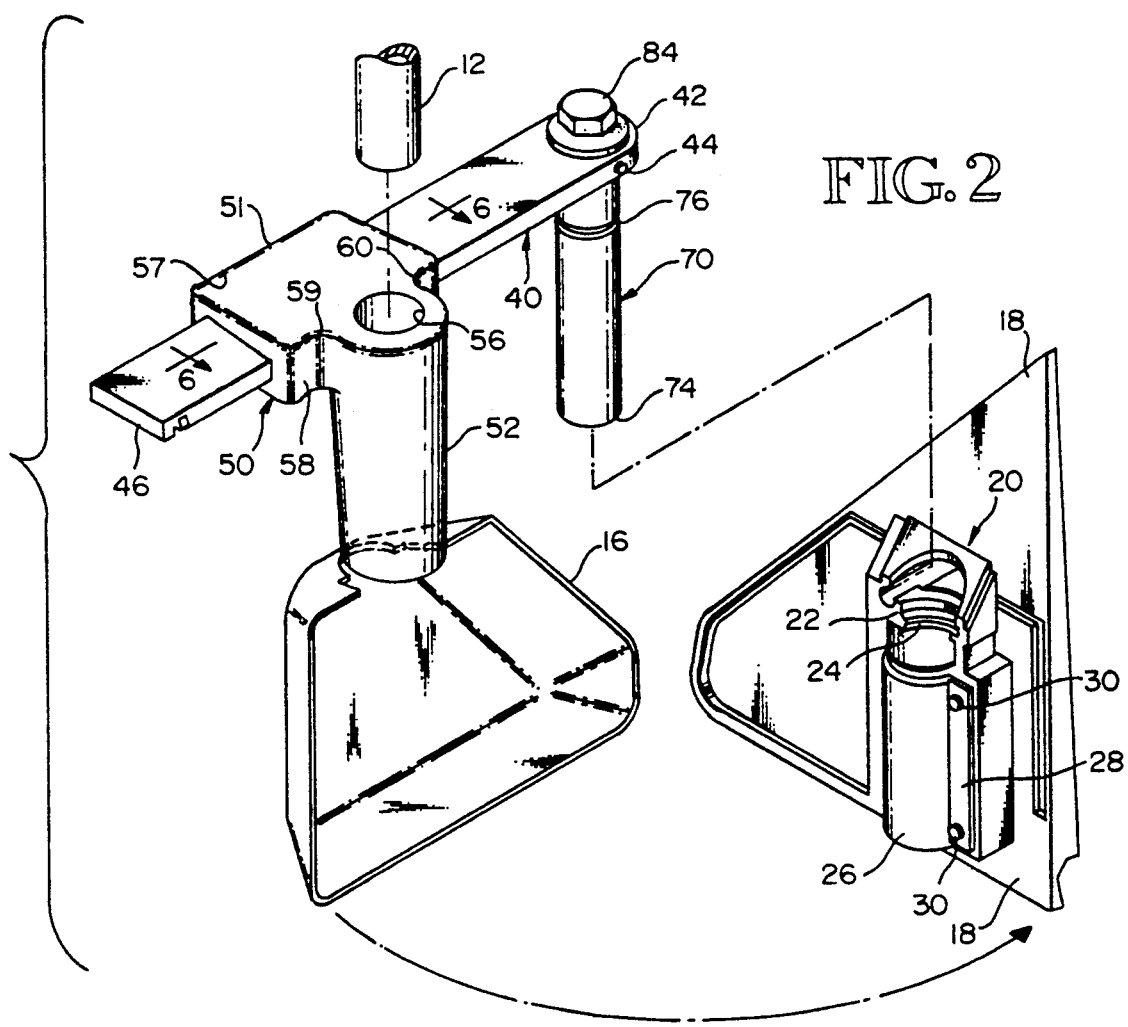
FIG. 2 is an exploded view in perspective showing the relationship between the components of the mirror assembly of this invention and the FIG. 1 door panel mounting structure.

Referring now to the drawings it will be seen that FIG. 1 represent a standard type of side view mirror mount for a vehicle such as a Chevrolet pick-up truck of van as modified to include the mirror assembly of this invention. Mirror head M is connected by a curved tubular support neck member 12 to the mounting frame 14 attached to the door panel of the vehicle by means of this invention's mirror assembly components. These components comprise an extension bar 40, a mounting block 50, and a replacement stem 70. Mirror head M and curved neck member 12 are part of the original equipment of the vehicle, as is the mounting frame 14.

To install the invention of this application, the mounting frame cover 16 is removed to expose the internal structure of mounting frame 14. The vertical section of the curved neck member 12 is removed from the mounting frame 14 and the replacement stem 70 is mounted in its place. The extension bar 40 is fastened to the replacement stem 70 and the vertical leg of the curved neck member 12 is inserted in the mounting block. The extension bar 70 may be pivoted in the mounting frame 14, just as the neck member 12 could in the original arrangement as supplied by the vehicle manufacturer. And the mirror head M may be pivoted about the neck member's horizontal section, just as the mirror head M could in the original arrangement as supplied by the vehicle manufacturer. Moreover, the distance of the mirror head M, relative to the vehicle door panel, now may be adjusted by sliding the mounting block 50 along the extension bar 40 toward or away from the mounting frame 14.

Support 14, which form no part of the invention herein, is original equipment by the manufacturer. Support 14 has a removable cover 16 and a mounting base 18 attached to the vehicle door. The mounting base 18 includes a mounting structure 20 having a roughly semi-circular cradle member 22 which includes a retainer ridge 24. A clamp part 26 has two detent extensions (not shown) along one edge which are inserted into the cradle structure 20. The other edge of the clamp part 26 has a flat lip 28 which is secured to the cradle structure by bolts 30.

To begin the installation of this invention, given a vehicle as it comes from the factory, the cover 16 is removed to expose the mounting structure 20. Bolts 30 are loosened so as to loosen clamp part 26 sufficiently that the vertical leg of the mirror head-carrying neck member 12 can be lifted vertically out of the mounting structure 20. The vertical leg of the neck member 12 will usually carry a plastic bearing sleeve 23 that must be removed therefrom. The replacement stem 70 has an outer configuration equivalent to the vertical leg of neck member 12, including the outer its diameter and length. The plastic sleeve 23 in slipped over the replacement stem 70 and the stem 70 is inserted into the mounting structure 20. Bolts 30 are tightened to resecure clamp part 26. Thus, replacement stem 70 become a substitution for the vertical leg of the neck member 12 within the mounting structure 20.

Replacement stem 70 has an upper end 72, a lower end 74 and is of a consistent diameter and wall thickness so that groove 76 can be formed therein to coincide with retainer ridge 24. Thus, when replacement stem 70 is substituted into the mounting structure 20, the entire mirror mounting assembly cannot be pulled out except by dismantling the support base 14.

Extension bar 40 is an elongated rectangular bar approximately ¼ inch thick by approximately 8 inches in length and about 1 inch in width. Bar 40 has an inner end 42 and an outer end 46. Near the inner end a round opening 48 is provided. Bar 40 has at least one recessed lock screw 40 threaded laterally through its side into opening 48. The opening 48 in bar 40 is received on an inwardly offset ledge at the upper end 72 of stem 70. The upper end 72 of stem 70 is provided with a threaded hole 88 to receive a bolt 84 having a shank 86. When bar 40 is fitted over stem 70, with the bar opening 48 fitting around the upper end 72 of stem 70, the inner end 42 of bar 40 sets on the stem ledge 47. Bolt 84 is then screwed down into contact with the upper surface of the bar 40 to secure the bar to the stem 70. Then set screw 44 is threaded into engagement with the shank 86 of bolt 84 to prevent removal or loosening of bolt 84. Thus bar 40 is secured firmly in place and is free of vibration. It will be noted that lock screw 44 extends through the bar 40 in threaded passage 49 and through opening 82 in the mounting section 80 at the upper end 72 of stem 70.

Mounting block 50 has a body providing a generally rectangular section 51 for receiving and sliding upon extension bar 40, and an integral depending section 52 for receiving the vertical leg of mirror head-carrying neck 12. Section 51 is provided with an enclosed generally horizontal, rectangular cavity 53 extending completely therethrough to open at an inner end 54 and at an outer end 55. Bar 40 slidably fits within cavity 53. Section 52 is provided with a generally vertical, cylindrical cavity 56 oriented to one side of cavity 53. Cavity 56, open at its upper end and closed at its lower end, has a diameter and length sufficient to received the vertical leg of neck 12 in a slip fit. Section 51 is thinner at its forward edge 57 and thicker at its rearward edge 58. The inner and outer ends 54,55 of section 51 diverge from its forward edge 57 toward its rearward edge 58 so that, in top plan view, section 51 has a trapezoidal configuration. Section 52 is joined to section 51 at the thicker rearward edge 58 and extends downwardly therefrom. Section 52 is frusto-conically shaped, having a larger cross-section at the top and a narrower cross-section at the bottom, and the elongated cavity 56 is axially bored therein. The axis of the neck-receiving cavity 56 is generally parallel to the longitudinal axis of replacement stem 70. Thus, when the vertical leg of neck 12 is inserted into cavity 56, the orientation of the mirror head will be the same as it was originally when neck 12 was mounting directly in support 14. The points at which section 52 merges into section 51 are coved, as at 59,60,61, to provide reinforcement at this juncture. Cavities 51 and 52 are machined to slip-fit tolerances with respect to bar 40 and neck 12, respectively.

An adjusting screw 62 is threaded into a threaded passage 63 through the underside of section 51 such that screw 62 may be threaded into engagement with a portion of bar 40, that is within the section 51, to secure the mounting block 50 at any point along the length of bar 40. Adjustment screw 62 has a knurled finger knob 63 so that the screw can be released easily and the block 50 moved to its desired location on the bar 40. Stop means 45 are provided at the outer end of bar 40 so that block 50 cannot be slidably removed from the bar. A set screw 65 extends through the forward edge of section 52 and into abutment with the neck 12 so as to secure the mirror head neck 12 within the neck-receiving cavity 56.

Mounting block 50 is carried by bar 40 with the adjustment screw 62 forward of the block section 52. By reason of this configuration, a driver, while sitting in the driver's seat of the vehicle, could reach out of his window wrap his palm around the depending section 52 and manipulate the screw 62 to loosen and tighten it with his thumb and index finger; without leaving the vehicle. When seeking to shift the location of the mirror head M with respect to the vehicle, after loosening the adjustment screw 62, the driver—with his palm around section 52—may easily grip section 52 and slide the mirror head M to the desired new position, and then conveniently retighten the screw 62 to secure the assembly in the new location. The taper of section 52 facilitates gripping the section during this maneuver.

While the preferred embodiment of the invention has been described herein, variations in the design may be made. The scope of the invention, therefore, is only to be limited by the claims appended hereto.

The embodiments of the invention in which an exclusive property is claimed are defined as follows:

1. In a side mounted rear view mirror assembly for vehicles including a mirror and mirror support neck member wherein the mirror support neck member has a vertical mounting leg, and further including generally horizontally disposed support bar means, the improvement comprising:

a) a mirror support block means slidably mounted on said support bar means and having a first section through which said support bar means extends, and having a second section positioned rearwardly of said first section and depending downwardly, said first section having an enclosed horizontal first cavity extending completely therethrough for receiving and sliding upon said support bar means, and said second section having an elongated vertically-oriented neck support second cavity extending downwardly and terminating therein for receiving and supporting the vertical mounting leg of said mirror support neck member, said neck support cavity being aligned generally perpendicularly to said first cavity and spaced rearwardly of said first cavity whereby insertion of the vertical mounting leg of the support neck member will locate said vertical mounting leg rearwardly of said support bar means whereby said mirror will be positioned at a desired elevation; whereby an original equipment mirror and mirror support neck member might be utilized without modification and so mounted for movement as to be capable of in and out movement relative to a vehicle side mounting assembly; and b) adjustment lock means in said block first section for releasably securing said block means to said support bar means at a desired position thereon; and second lock means in said block second section adapted to hold and secure said support neck member in said neck support cavity.

2. The side mounted rear view mirror assembly according to claim 1 and wherein said adjustment lock means is a threaded screw member with finger gripping means thereon for quickly tightening and releasing said screw member with respect to said support bar means; said adjustment lock means being located underneath said block first section and in line with and forwardly of said neck support cavity in said block second section.

3. The side mounted rear view mirror assembly according to claim 1 wherein said block means is made of a casting and said first and second sections are integral with said second section positioned rearwardly of said first section and depending therefrom, said first section being thicker and wider at its rearward edge that at its forward edge, and said second section being wider at its upper end than at its lower end, whereby the casting is reinforced at the juncture of said first section with said second section.

4. The side mounted rear view mirror assembly according to claim 1 wherein a vehicle is provided with a mirror support means having a mirror neck retainer cradle assembly and a releasable clamp means coacting with the cradle assembly to hold a mirror neck therein, and including a replacement stem means fitted within said mirror neck retainer cradle assembly and held therein by said releasible clamp means in place of said mirror support neck member to provide a vertical pivot axis; said support bar means being secured to the top of said stem means and extending outward from the vehicle whereby said support bar means may be pivoted about the vertical pivot axis to swing the mirror and mirror support neck member.

5. The side mounted rear view mirror assembly according to claim 4 wherein the top of said replacement stem is provided with an inwardly offset ledge and said support bar means is provided with an opening fitted around the top of said stem whereby said support bar means set on said inwardly offset ledge; and wherein the top of said stem is provided with a threaded passage; and including a lock screw means screwed into said threaded passage to bear against the top of said support bar means to secure said bar means onto said inwardly offset ledge whereby said support bar means will cantilever outward from said stem in a secure manner without vibrating relative to said stem.

6. In a side mounted rear view mirror assembly for vehicles including a mirror and mirror support neck member wherein the mirror support neck member has a vertical mounting leg, and further including generally horizontally disposed support bar means, the improvement comprising:

a) a mirror support block means slidably mounted on said support bar means and having a first section through which said support bar means extends, and having a second section positioned rearwardly of said first section and depending downwardly, said first section having an enclosed horizontal first cavity extending completely therethrough for receiving and sliding upon said support bar means, and said second section having an elongated vertically-oriented neck support second cavity extending downwardly and terminating therein for receiving and supporting the vertical mounting leg of said mirror support neck member, said neck support cavity being aligned generally perpendicularly to said first cavity and spaced rearwardly of said first cavity whereby insertion of the vertical mounting leg of the mirror support neck member will locate said vertical mounting leg rearwardly of said support bar means whereby said mirror will be positioned at a desired elevation; whereby an original equipment mirror and mirror support neck member might be utilized without modification and so mounted for movement as to be capable of in and out movement relative to a vehicle side mounting assembly;

b) adjustment lock means in said block first section for releasably securing said block means to said support bar means at a desired position thereon; and second lock means in said block second section adapted to hold and secure said support neck member in said neck support cavity;

said adjustment lock means comprising a threaded screw member with finger gripping means thereon for quickly tightening and releasing said screw member with respect to said support bar means; said adjustment lock means being located underneath said block first section and in line with and forwardly of said neck support cavity in said block second section; and said block means being made of a casting with said first and second sections being integral, and with said second section positioned rearwardly of said first section and depending therefrom, said first section being thicker and wider at its rearward edge that at its forward edge, and said second section being wider at its upper end than at its lower end, whereby the casting is reinforced at the juncture of said first section with said second section.

7. The side mounted rear view mirror assembly according to claim 6 wherein a vehicle is provided with a mirror support means having a mirror neck retainer cradle assembly and a releasable clamp means coacting with the cradle assembly to hold a mirror neck therein, and including a replacement stem means fitted within said mirror neck retainer cradle assembly and held therein by said releasible clamp means in place of said mirror support neck member; said support bar means being secured to the top of said stem means and extending outward from the vehicle.

8. The side mounted rear view mirror assembly according to claim 7 wherein the top of said replacement stem is provided with an inwardly offset ledge and said support bar means is provided with an opening fitted around the top of said stem whereby said support bar means set on said inwardly offset ledge; and wherein the top of said stem is provided with a threaded passage; and including a lock screw means screwed into said threaded passage to bear against the top of said support bar means to secure said bar means onto said inwardly offset ledge whereby said support bar means will cantilever outward from said stem in a secure manner without vibrating relative to said stem.

* * * * *